(12) United States Patent
Giannotti et al.

(10) Patent No.: US 11,079,931 B2
(45) Date of Patent: Aug. 3, 2021

(54) USER INTERFACE FOR IN-VEHICLE SYSTEM

(71) Applicant: Harman International Industries, Incorporated, Stamford, CT (US)

(72) Inventors: Angelo A. Giannotti, Belleville, MI (US); Brian James Debler, Northville, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 251 days.

(21) Appl. No.: 15/773,393

(22) PCT Filed: Nov. 10, 2016

(86) PCT No.: PCT/US2016/061258
§ 371 (c)(1),
(2) Date: May 3, 2018

(87) PCT Pub. No.: WO2017/083477
PCT Pub. Date: May 18, 2017

(65) Prior Publication Data
US 2018/0321843 A1  Nov. 8, 2018

Related U.S. Application Data

(60) Provisional application No. 62/254,935, filed on Nov. 13, 2015.

(51) Int. Cl.
*G06F 3/0488* (2013.01)
*G06F 3/0481* (2013.01)
(Continued)

(52) U.S. Cl.
CPC .......... *G06F 3/04886* (2013.01); *B60K 35/00* (2013.01); *G06F 3/0481* (2013.01);
(Continued)

(58) Field of Classification Search
CPC ............... G06F 3/04886; G06F 3/0481; G06F 3/04845; G06F 2203/04803; B60K 35/00; B60K 2350/1004; B60K 2350/1028
See application file for complete search history.

(56) References Cited

U.S. PATENT DOCUMENTS 6,211,856 B1   4/2001  Choi et al.
7,124,360 B1  10/2006  Drenttel et al.
(Continued)

FOREIGN PATENT DOCUMENTS

CN    101676853 A    3/2010
CN    102035934 A    4/2011
(Continued)

OTHER PUBLICATIONS

ISA United States Patent and Trademark Office, International Search Report and Written Opinion Issued in Application No. PCT/US2016/061258, dated Jan. 19, 2017, WIPO, 15 pages.
(Continued)

*Primary Examiner* — Seth A Silverman
(74) *Attorney, Agent, or Firm* — McCoy Russell LLP

(57) ABSTRACT

Embodiments are disclosed for presenting a multi-view user interface in which a plurality of application interfaces are displayed simultaneously. An example in-vehicle computing system includes a display, a user input interface, a processor, and a storage device storing instructions executable by the processor to present a multi-view user interface including a plurality of simultaneously-displayed application interfaces displaying content for different applications, each application interface filling at least one cell of a grid. The instructions are further executable to detect user input requesting the application interfaces to be resized, the user input indicating an updated location of at least one boundary of at least two of the application interfaces, and adjust the size of each application interface by snapping the at least one
(Continued)

boundary of the at least two application interfaces to a nearest cell boundary of a cell of the grid.

20 Claims, 14 Drawing Sheets

(51) Int. Cl.
*G06T 3/40* (2006.01)
*B60K 35/00* (2006.01)
*G06F 3/0484* (2013.01)
*G06F 3/14* (2006.01)
*G09G 5/14* (2006.01)

(52) U.S. Cl.
CPC ........ *G06F 3/0488* (2013.01); *G06F 3/04845* (2013.01); *G06T 3/40* (2013.01); *B60K 2370/11* (2019.05); *B60K 2370/1438* (2019.05); *G06F 3/14* (2013.01); *G06F 2203/04803* (2013.01); *G09G 5/14* (2013.01); *G09G 2340/04* (2013.01); *G09G 2380/10* (2013.01)

(56) References Cited

U.S. PATENT DOCUMENTS

| | | |
|---|---|---|
| 7,683,771 B1 | 3/2010 | Loeb |
| 2003/0122779 A1 | 7/2003 | Martin et al. |
| 2007/0101283 A1 | 5/2007 | Miyamoto |
| 2010/0138767 A1 | 6/2010 | Wang et al. |
| 2011/0157167 A1 | 6/2011 | Bennett et al. |
| 2012/0084717 A1* | 4/2012 | Yao ....................... G06F 3/0481 715/792 |
| 2012/0254782 A1 | 10/2012 | Van Ieperen et al. |
| 2013/0145360 A1* | 6/2013 | Ricci ................... G06F 3/04817 717/174 |
| 2013/0321402 A1* | 12/2013 | Moore ............... G01C 21/3611 345/419 |
| 2015/0007078 A1 | 1/2015 | Feng et al. |
| 2015/0178034 A1 | 6/2015 | Penilla et al. |
| 2015/0186024 A1 | 7/2015 | Hong et al. |
| 2015/0199093 A1* | 7/2015 | Kuscher ............. G06F 3/04812 715/788 |
| 2015/0205446 A1 | 7/2015 | Kuscher et al. |
| 2015/0293509 A1 | 10/2015 | Bankowski et al. |

FOREIGN PATENT DOCUMENTS

| | | |
|---|---|---|
| CN | 102109944 A | 6/2011 |
| CN | 102591575 A | 7/2012 |
| CN | 102673473 A | 9/2012 |
| CN | 103250094 A | 8/2013 |
| CN | 103870282 A | 6/2014 |
| CN | 104836915 A | 8/2015 |
| DE | 102010048745 A1 | 4/2012 |
| EP | 2595042 A2 | 5/2013 |
| JP | 2001014479 A | 1/2001 |
| KR | 101565781 B1 | 11/2015 |
| WO | 2013184472 A2 | 12/2013 |
| WO | 2014088343 A1 | 6/2014 |

OTHER PUBLICATIONS

European Patent Office, Extended European Search Report Issued in Application No. 16864973.9, dated May 2, 2019, 8 pages.

State Intellectual Property Office of the People's Republic of China, Office Action and Search Report Issued in Application Serial No. 201680066125.1, dated Sep. 2, 2020, 25 pages. (Submitted with Partial Translation).

* cited by examiner

USER INTERFACE FOR IN-VEHICLE SYSTEM

CROSS REFERENCE TO RELATED APPLICATIONS

The present application is a national phase of International Patent Application No. PCT/US2016/061258, entitled "USER INTERFACE FOR IN-VEHICLE SYSTEM", filed on Nov. 10, 2016. International Patent Application No. PCT/US2016/061258 claims priority to U.S. Provisional Application No. 62/254,935, entitled "USER INTERFACE FOR IN-VEHICLE SYSTEM", filed on Nov. 13, 2015. The entire contents of each of the above-listed applications are hereby incorporated by reference for all purposes.

FIELD

The disclosure relates to user interfaces for computing devices.

BACKGROUND

Computing devices may utilize user interfaces to facilitate user interaction and/or control over the computing device. Such user interfaces may provide the dual roles of displaying information and providing mechanisms for user selection or user specification of control instructions.

SUMMARY

Some environments, such as vehicle computing systems (e.g., infotainment devices), may typically display a user interface for a single application at a time. In order to access other applications, a user may have to provide multiple inputs to exit a current application, locate another application, and select the other application for display. Even in other environments, such as desktop computing environments, each application may be displayed in an independent user interface window. In order to switch focus between applications, a user may manually select, resize, and move each application separately.

Embodiments are disclosed for a user interface that enables multiple applications to be viewed, controlled, and resized simultaneously. An example in-vehicle computing system includes a display device, a user input interface, a processor, and a storage device storing instructions executable by the processor to present, via the display device, a multi-view user interface including a plurality of application interfaces each displaying content for a different application simultaneously with one another, each application interface filling at least one cell of a grid according to which the display of the user interface is controlled. The instructions are further executable to detect, via the user input interface, user input requesting the application interfaces to be resized, the user input indicating an updated location of at least one boundary of at least two of the application interfaces, and selectively adjust the size of each application interface by snapping the at least one boundary of the at least two application interfaces to a nearest cell boundary of a cell of the grid.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
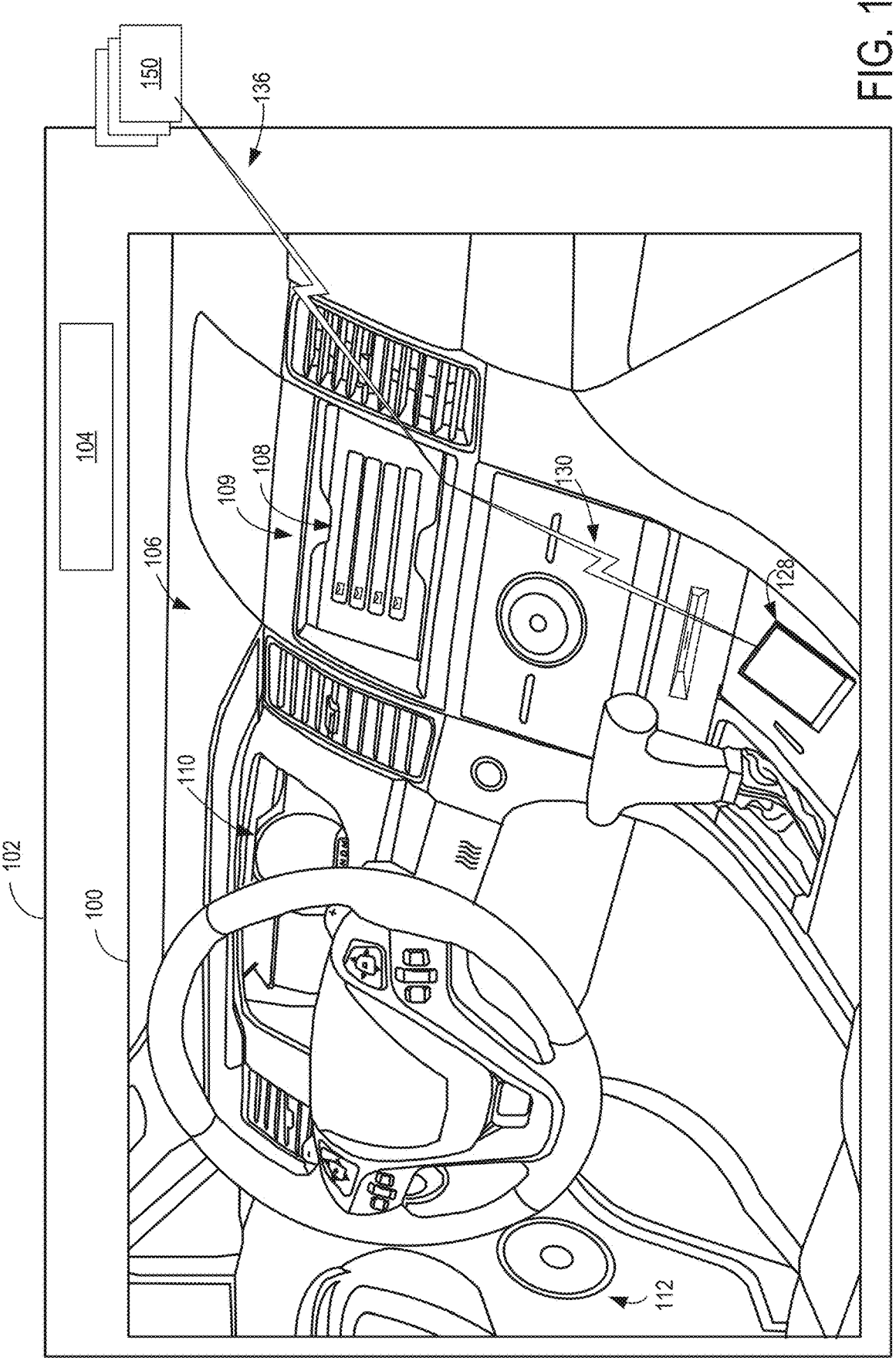
FIG. 1 shows an example partial view of a vehicle cabin in accordance with one or more embodiments of the present disclosure.

In a vehicle environment, a driver's main focus is directed toward driving. However, in order to assist with such focus, an in-vehicle computing system (e.g., an infotainment system installed in the vehicle) may present useful information and provide easy-to-use controls for adjusting vehicle systems. For example, an in-vehicle computing system may execute applications such as a navigation application to assist the driver in selecting or traveling to a destination, a music playback application to entertain the driver and/or passengers and alleviate boredom, and a phone application to allow the driver and/or passengers to make calls without diverting focus to a separate mobile device. Other example application may include a climate control application to adjust the atmosphere in the cabin of the vehicle (e.g., to increase comfort and/or combat dreariness), a driving assistance application (e.g., providing rear-, side-, and/or front-view camera output, parking assistance, vehicle tuning, and/or other driver assistance features), and/or any other suitable application(s).

As discussed briefly above, in other systems, a user may only view one of the above-described applications on an in-vehicle computing system display at a time. Further, the user may traverse multiple menus and/or provide multiple inputs in order to switch between applications. Such an approach to providing a user interface is typically provided due to the limited screen size of in-vehicle computing systems. For example, compared to general computing environments, which may typically utilize displays ranging from 13 inches (measured diagonally) to 30 inches or larger, specialized computing environments, such as mobile computing devices and in-vehicle computing systems, may only include displays that are 2 inches to 8 inches in size. With such small displays, presenting user interfaces for multiple applications simultaneously may be challenging, due to the resultant size of each user interface window/region.

The present disclosure addresses such challenges by providing a user interface that displays multiple applications simultaneously and allows a user to dynamically adjust the relative size of each application interface as conditions change. To address the viewability concerns with showing multiple application interfaces at once, the disclosed methods and systems may adjust the type and/or amount of information that is displayed for a given application interface. For example, only selectable icons may be displayed for an application interface that is below a certain threshold in size, while a combination of selectable icons and text or images may be displayed if the application is adjusted to a size that is above the threshold.

In order to facilitate quick, one-touch resizing of application interfaces, the disclosure describes a resize interface element that is positioned at an intersection of the simultaneously displayed application interfaces. Selecting (e.g., tapping) and dragging the single resize interface element may simultaneously adjust the size and/or aspect ratio of each application interface. These and other features are described in more detail below and illustrated in the associated figures.

FIG. 1 shows an example partial view of one type of environment for a multi-view user interface: an interior of a cabin 100 of a vehicle 102, in which a driver and/or one or more passengers may be seated. Vehicle 102 of FIG. 1 may be a motor vehicle including drive wheels (not shown) and an engine 104. Engine 104 may be an internal combustion engine including one or more combustion chambers which may receive intake air via an intake passage and exhaust combustion gases via an exhaust passage in some examples. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle. Vehicle 102 may be a motorcycle, a marine vehicle, a locomotive, or any other vehicle in some examples. For example, where vehicle 102 is a marine vehicle, the routes/route segments described herein may refer to waterways that may be travelled by the marine vehicle. As waterway conditions may be more volatile than roadway conditions, the route/route segment scoring described herein may additionally factor in reported conditions from other travelers about a given waterway (e.g., as determined by analyzing profile/status updates made by users to a social networking service) to provide more real-time information regarding the condition of the waterway. However, it is to be understood that such crowd-sourcing of condition information may also be used in determining a route/route segment score for roadways.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user and/or a driving experience of a user (e.g., where pressure changes may correspond to irregularities in the route segment), microphones to receive user input in the form of voice commands, to measure road noise that may be indicative of a quality of the route segment, to enable a user to conduct telephone calls, and/or to measure ambient noise in the cabin 100, cameras mounted on the vehicle, accelerometer and/or gyroscopes coupled to the vehicle capable of measuring acceleration of the vehicle, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle (e.g., based on signals received at a mobile device and/or at an in-vehicle computing system indicating vehicle diagnostics), ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, camera, accelerometer, gyroscope, inclinometer etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
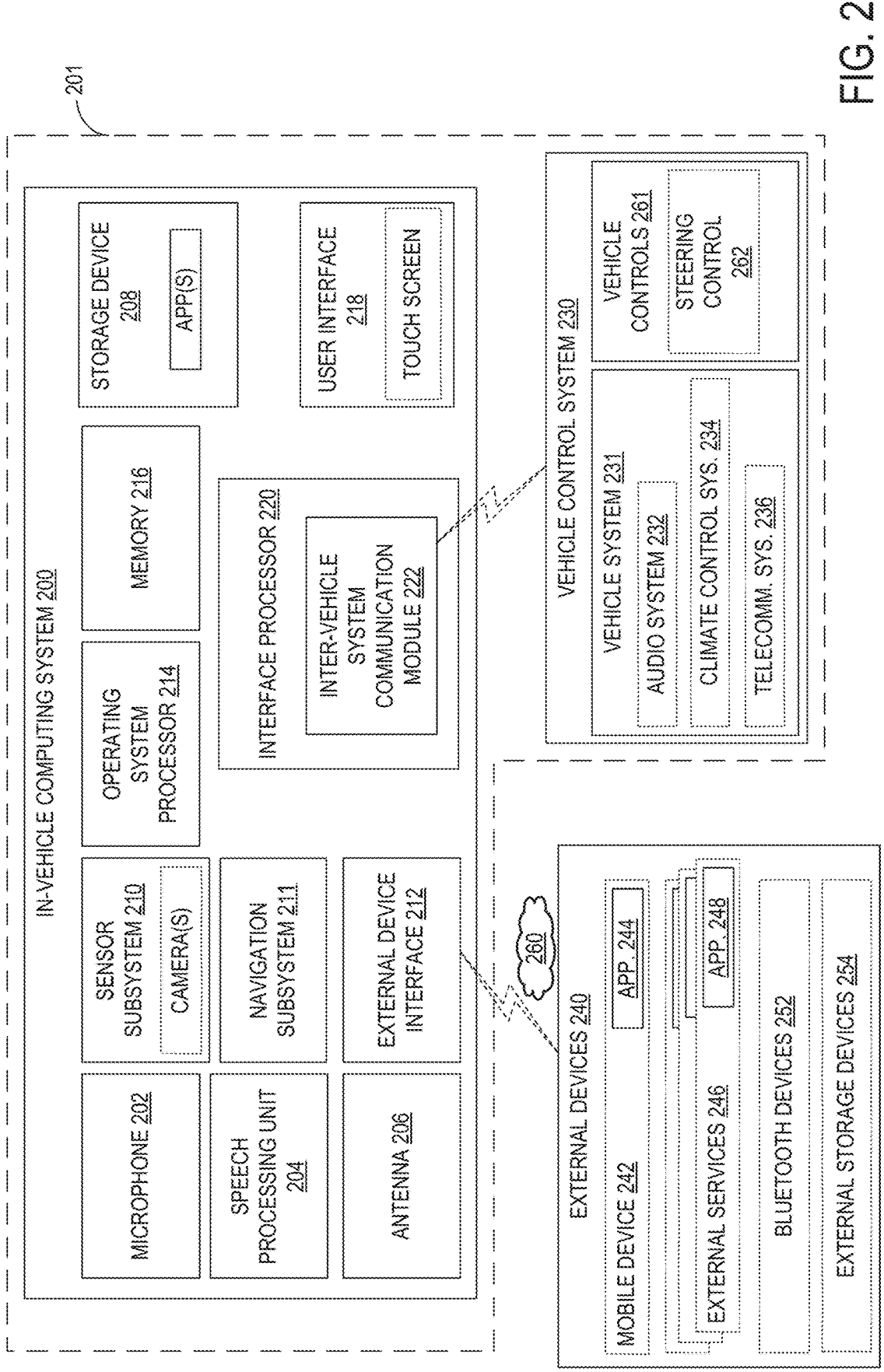
FIG. 2 shows an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. The operating system may control and/or oversee the execution of applications of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run one or more applications, which may connect to a cloud-based server and/or collect information for transmission to the cloud-based server, control vehicle systems, display information, accept user input, and/or perform any other suitable function. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle, a cabin camera for identifying a user (e.g., using facial recognition and/or user gestures), and/or a front view camera to assess quality of the route segment ahead. Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, vehicle motion, vehicle inclination, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver. The navigation subsystem 211 may include an inertial navigation system that may further determine a position, orientation, and velocity of the vehicle via motion and rotation sensor inputs. Examples of motion sensors include accelerometers, and examples of rotation sensors include gyroscopes. The navigation subsystem 211 may communicate with motion and rotation sensors included in the sensor subsystem 210. Alternatively, the navigation subsystem 211 may include motion and rotation sensors and determine the movement and rotation based on the output of these sensors.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct, as described in more detail below.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna (s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, route/route segment quality preference, route/route segment avoidance preference, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Figure 3A:
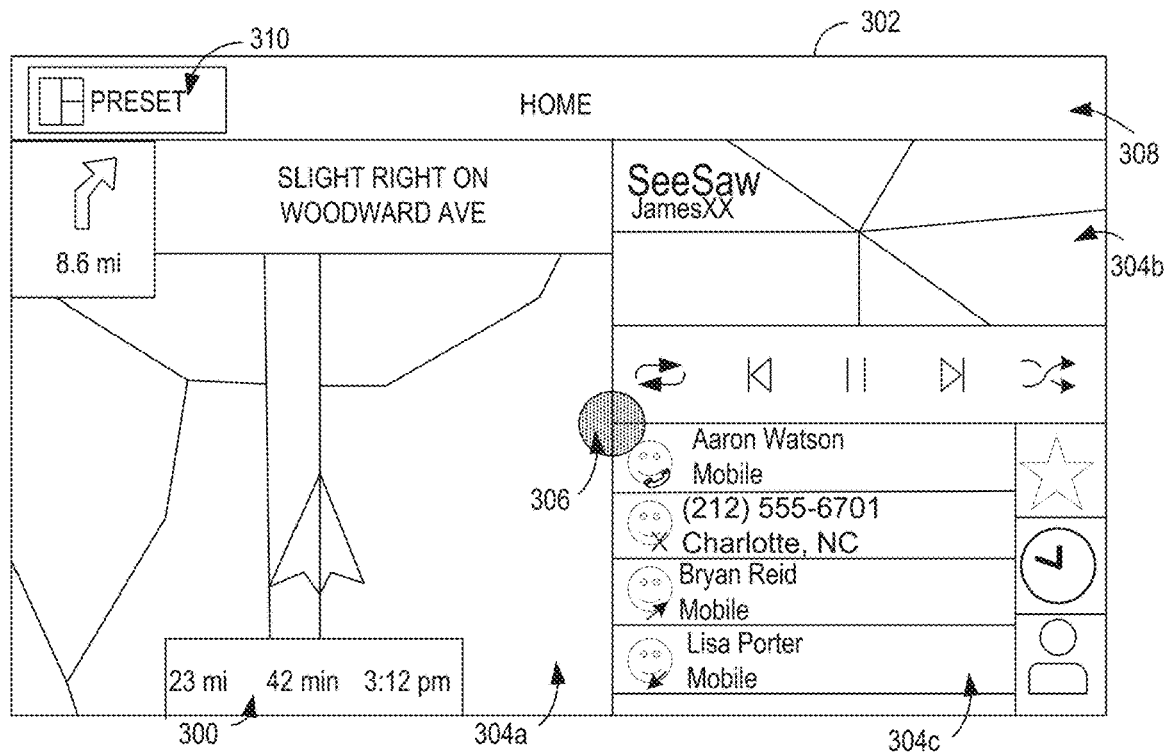
FIGS. 3A and 3B show example user interfaces including multiple simultaneously-displayed application interfaces in accordance with one or more embodiments of the present disclosure.
Figure 3B:
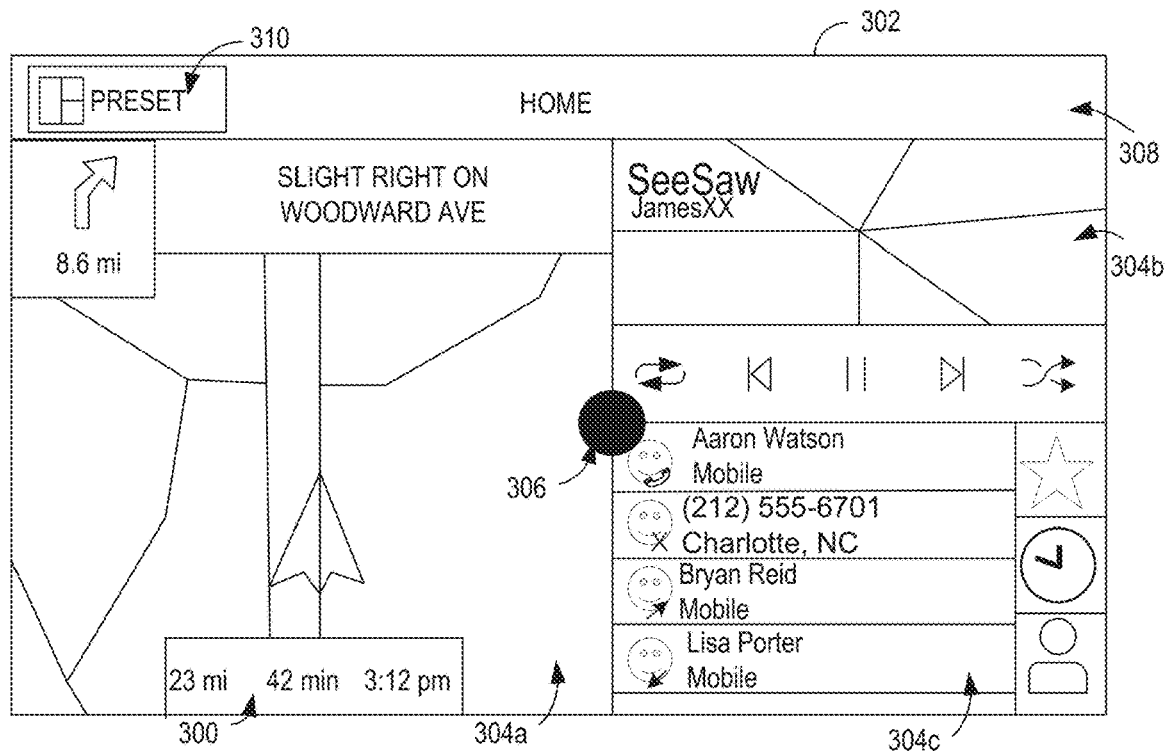

FIGS. 3A and 3B show example appearances of a user interface 300 displayed on a display device 302 (e.g., a display device of an in-vehicle computing system, such as in-vehicle computing system 109 of FIG. 1 or 200 of FIG. 2). The user interface 300 may be used to present a plurality of application interfaces 304a, 304b, and 304c. As used herein, an application interface may refer to a portion of a user interface associated with a respective application. A user may interact with any displayed application interface in order to provide user input to that application. For example, while displaying an application interface for both navigation and a media applications, a user may provide input to the navigation application (e.g., panning/zooming a map, entering a destination, etc.) by interacting with the region of the display presenting the navigation application interface. In the same user interface, the user may also provide input to the media application (e.g., skipping to a next song, pausing playback of media, etc.) by interacting with the region of the display presenting the media application interface.

In the illustrated example, only three application interfaces are shown. However, it is to be understood that any suitable number of application interfaces may be simultaneously displayed and resized as described herein. For example, two or four applications may be displayed simultaneously in some examples. In the illustrated example, application interface 304a relates to a navigation application, application interface 304b relates to a media application, and application interface 304c relates to a communication (e.g., phone) application. In other examples, different applications may be represented by the respective application interfaces and/or the illustrated application interfaces may be presented in different locations.

The illustrated application interfaces are shown as intersecting at a common point. For example, each application interface may have boundaries within the user interface (e.g., multiple sides, such as four sides as illustrated in FIGS. 3A and 3B, inside of which an interface for a respective application is presented), and the boundaries of each application interface may be joined at a single point. This point of intersection is overlaid with a user interface element, such as resizing control 306. The resizing control 306 is shown in FIG. 3A in an unselected state and in FIG. 3B in a selected state (e.g., where an appearance of the user interface element, such as the opacity, size, color, etc., is changed). By selecting (e.g., clicking or tapping/touching) and then dragging the resizing control 306, a user may resize each of the displayed application interfaces in user interface 300 simultaneously. Examples of such resizing are described in more detail below with respect to FIGS. 5-6D.

In examples where two application interfaces are shown simultaneously, an associated resizing control may be presented at a location of intersection of the two application interfaces (e.g., along a shared side of the application interfaces, as each application interface may be displayed side-by-side or on top of one another). Similarly, in examples where four application interfaces are shown simultaneously, an associated resizing control may be presented at a location of intersection of the four application interfaces (e.g., each application interface may occupy a corner of the user interface, and each interface may intersect each other interface at one of a bottom left, bottom right, top left, or top right of that interface, based on the position of that interface). In still other examples, at least one of the simultaneously-displayed application interfaces does not touch each other simultaneously-displayed application interface. In such examples, multiple resize controls may be provided at points of intersection, or a centralized control element may be provided which resizes different portions of the user interface based on a direction of movement of the control element.

In some examples, a user may change a size and/or position of application interfaces by interacting directly with that application interface. For example, a user may provide different types of input within an application interface in order to change the size of that interface to a maximum size, a minimum size, a default size (e.g., a middle size in a range of possible sizes for that interface), and/or any other predetermined size. In some examples, a tap/short click input within boundaries of an application interface may cause that application interface to be selected, and further inputs may be provided to resize the application interface to a predetermined size (e.g., with each different gesture/input resulting in a different predetermined resizing). In other examples, each different type of input to the application interface may directly cause a different predetermined resizing (e.g., without the application interface being separately selected first). For example, a long press (e.g., maintaining a mouse button or a touch to the display for at least a threshold period of time) or double tap/click may cause the application interface to snap to a maximum possible size, while a short press and release (e.g., a tap and/or otherwise maintaining a mouse button or a touch to the display for less than the threshold period of time) may cause the application interface to snap to a default (e.g., middle) size.

In some examples, a tap or selection of an application interface may bring up a menu of possible sizes to which that application interface may be snapped. In such examples, the menu may additionally or alternatively provide options for changing an application that is presented in that application interface position of the user interface. In additional or alternative examples, a selection input may allow a user to rearrange the positions of application interfaces (e.g., a long press may select an application interface, and a dragging of the application interface without disengaging the long press may allow the user to swap the application interface with another displayed application interface to change their positions).

As shown in FIGS. 3A and 3B, a top portion 308 of user interface 300 may present information regarding the user interface. For example, the top portion may include an identifier for the user interface (e.g., a "Home" screen or another designation). Additional information, such as status information for the vehicle/vehicle systems/vehicle environment may be presented in this top portion of the user interface. For example, date/time, weather information (e.g., temperature), device/vehicle status (e.g., a battery level for mobile devices, a fuel level for an in-vehicle computing system, volume level for a speaker, climate control or other vehicle system setting, etc.), alerts (e.g., missed calls/unread messages, warnings, maintenance schedules, upcoming calendar appointments, etc.), and/or other information may be presented in the top portion 308.

Menu or other operating system/application navigation options may also be presented in the top portion 308. For example, a preset button 310 is illustrated in FIGS. 3A and 3B. The preset button may be selected in order to revert the user interface to a preset arrangement/size of application interfaces and/or to set a current layout as a preset. For example, different selection mechanisms of the preset button may provide different actions (e.g., a short tap/click and release may revert the user interface to a previously-stored or default preset layout, while a long press may store a current layout as a user-defined preset layout). In some examples, selection of the preset button 310 may cause a preset menu (e.g., a drop down or slide-out menu) to be displayed. In such examples, multiple presets may be able to be stored for later selection, and different menu items may be presented for each stored preset and for controlling the system to store a current layout as a preset. As will be illustrated in later figures, additional user interface buttons/menus may be displayed in top portion 308, such as a restore button to restore the user interface to an immediately-prior layout (e.g., prior to a most recent user actuation of the resizing control 306 to resize the application interfaces) and/or a default layout.

Figure 4:
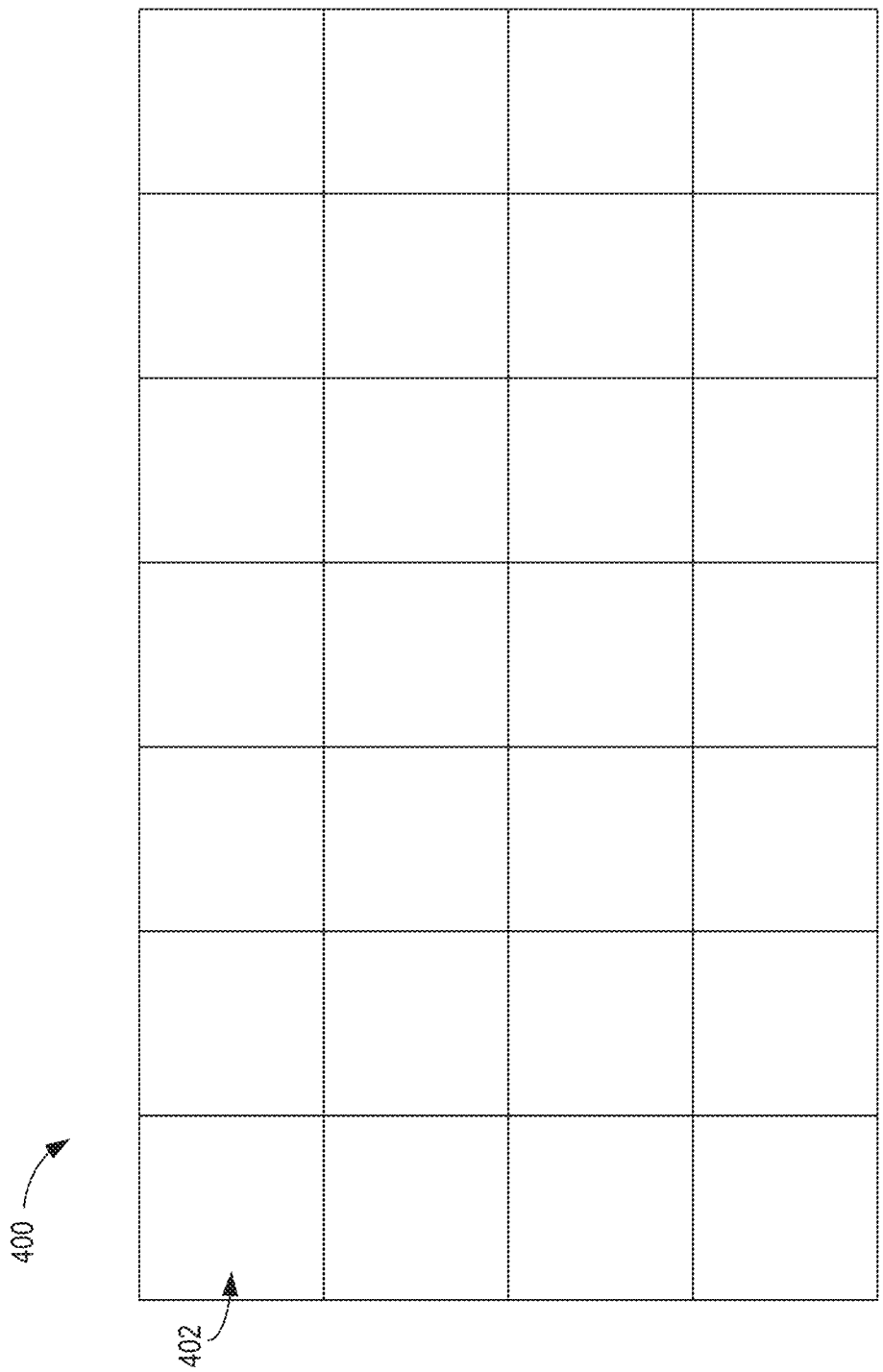
FIG. 4 shows an example grid for aligning application interface boundaries in accordance with one or more embodiments of the present disclosure.

As described above, one or more input mechanisms may be provided for a user to resize displayed application interfaces. In order to ensure that material displayed in each application interface remains undistorted, the user interface may be divided into a grid layout, as illustrated in FIG. 4. The grid 400 illustrated in FIG. 4 may represent a portion of a user interface (e.g., user interface 300 of FIG. 3) that is dedicated to the display of application interfaces. Each application interface of the user interface may occupy a particular number of cells 402 of grid 400. The number/quantity, size/aspect ratio, and/or shape of cells of a grid for a user interface may be based on the size, resolution, and/or other parameter of the display device presenting the user interface and/or on the applications being displayed by the display device. The grid illustrated in FIG. 4 may be used to control the resizing of application interfaces within a user interface, but may not be displayed during presentation of the user interface. The size of each cell 402 of grid 400 may be much larger than the size of a pixel of an associated display device on which a user interface that is controlled with respect to the grid is displayed. For example, each cell 402 may have a size measurable in a plurality of pixels (e.g., x pixels wide by x pixels high, where x is greater than 1). In one non-limiting example, each cell may measure 60 pixels by 60 pixels. In another non-limiting example, each cell may measure 105 pixels by 105 pixels.

Figure 5:
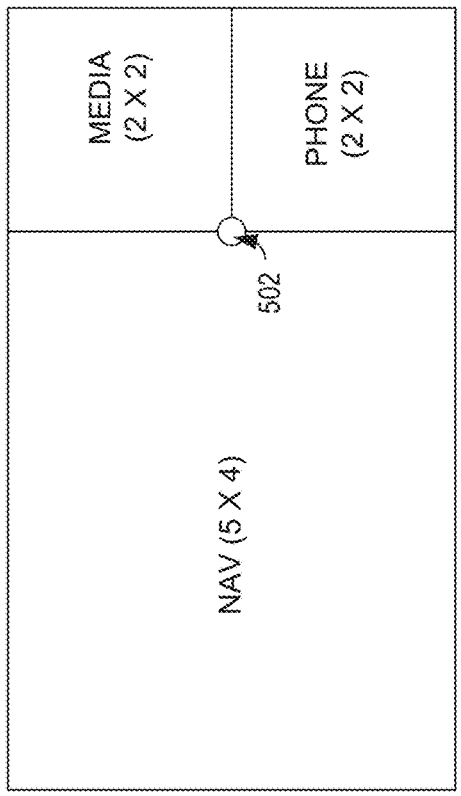
FIG. 5 shows example layouts of application interfaces within a user interface in accordance with one or more embodiments of the present disclosure.
Figure 5:
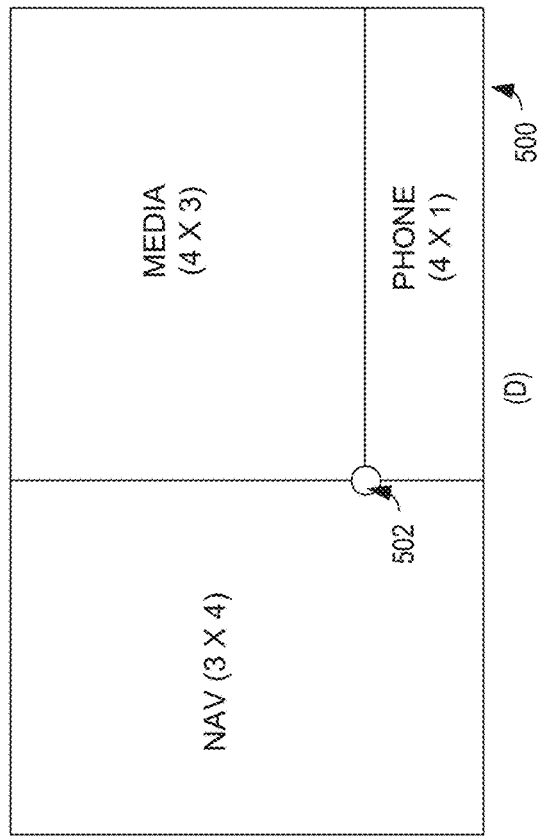
Figure 5:
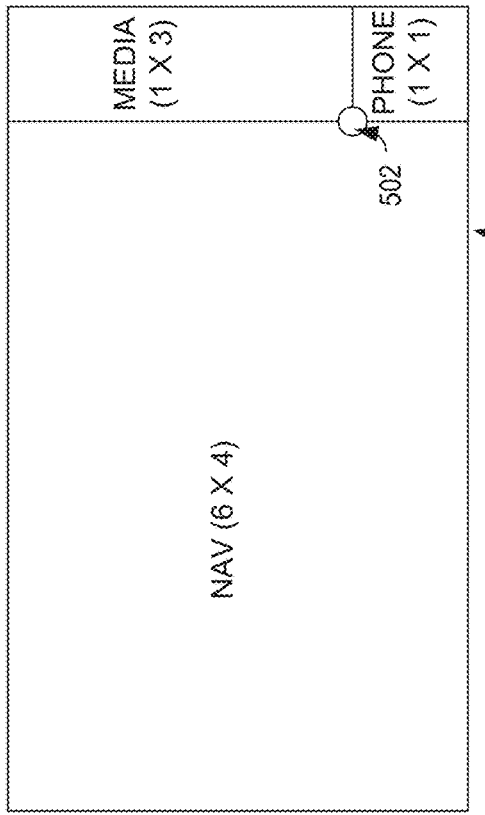
Figure 5:
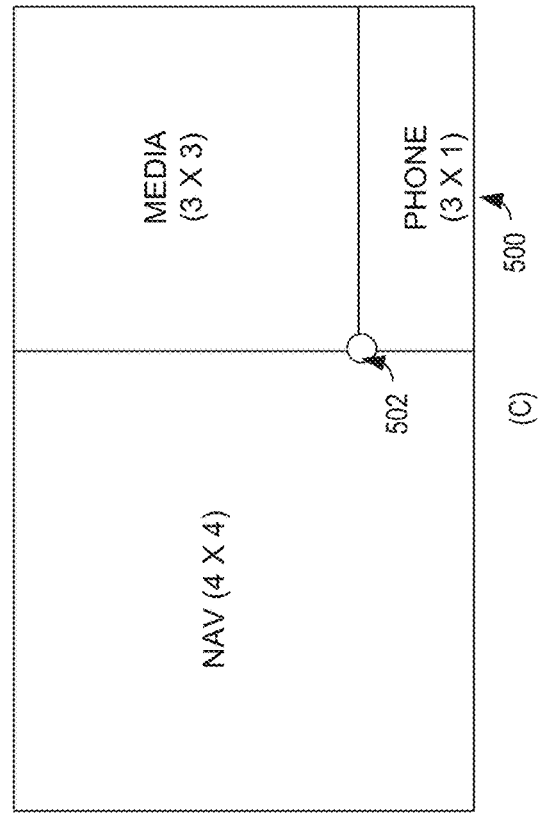

Example layouts of application interfaces within a user interface 500 are illustrated in FIG. 5. The applications represented in FIG. 5 include navigation, media, and phone applications, but it is to be understood that any suitable application (e.g., including any of those described herein) may be presented via the illustrated application interfaces. In layout A of FIG. 5, the navigation application interface is shown as occupying 6×4 grid cells (e.g., 6 cells wide by 4 cells high—the aspect ratios described herein will be presented in the form of width×height), the media application interface is shown as occupying 1×3 cells, and the phone application interface is shown as occupying 1×1 cell. Layouts B, C, and D of FIG. 5 show other, non-exhaustive, example layouts of application interfaces.

Each user interface position and/or application interface may have a maximum and/or a minimum size associated therewith. For example, a minimum size may be based on content of the application interface. In the example of a navigation application interface, the navigation information may be difficult to present within a single cell or a single column of cells. Accordingly, a navigation application interface may have a minimum width of 2 cells and/or a minimum size of 2×4 cells. Each of the media application interface and the phone application interface may be capable of presenting usable information/controls within a single grid cell. Accordingly, each of these application interfaces may have a minimum size of 1×1 cell. The maximum size of each application interface may be determined based on the minimum sizes of each other simultaneously-displayed application interface and/or the position of that application interface. In the illustrated example, the navigation application interface may have a maximum size of 6×4 cells (as shown in layout A). If the navigation application interface were to occupy more cells (e.g., have a width of 7 cells), the media and phone application interfaces may not be able to be displayed. Likewise, the media and phone application interfaces may each have a maximum height of 3 cells and a maximum width of 5 cells. If either the media or phone application interfaces were to occupy more than 3 cells high (e.g., have a height of 4 cells), the other of the media or phone application interfaces would not have space to be displayed. If either the media or phone application interfaces were to occupy more than 5 cells wide (e.g., have a width of 6 or 7 cells), the space left for the navigation application interface would be smaller than the minimum size allotted for the navigation application interface.

In some examples, the maximum size of an application interface may be defined in terms of an overall area instead of a width or length. For example, the user interface may automatically rearrange in order to accommodate a specified aspect ratio for an application interface that satisfies an overall area threshold, but would not have satisfied the above-described width or length thresholds. Taking layout A of FIG. 5 as an example, the navigation application interface may be resized to occupy 7 cells in width, if the application interface is also resized to occupy only 3 cells in height (e.g., to have a size of 7×3 cells). In response to such a resize request (e.g., upon detecting that the user has dragged a resize control 502 to the side edge of the user interface), the system may automatically snap the navigation application interface to occupy a top 3 cells of the user interface and move the media and phone application interfaces to occupy the bottom row of cells of the user interface (e.g., each having a height of 1 cell and a width corresponding to a prior height of that interface-3 cells for the media application and 1 cell for the phone application). Table 1 provides example maximum and minimum sizes (in units of pixels or percentage of available display space) for application interfaces and a status bar (e.g., a top portion) of a user interface.

TABLE 1

| Title | Landscape | | Portrait | |
| --- | --- | --- | --- | --- |
| | Min. Width | Min. Height | Min. Width | Min. Height |
| Status Bar (not user-configurable) | 100% | 60 pixels | 100% | 60 pixels |
| Navigation | 200 pixels | 100% | 100% | 200 pixels |
| Media | 120 pixels | 105 pixels | 120 pixels | 108 pixels |
| Phone | 120 pixels | 105 pixels | 120 pixels | 108 pixels |

In general, when resizing the application interfaces, a user may drag resize control 502 in any direction to change the sizes of each displayed application interface in a coordinated manner. For example, dragging the resize control 502 to the left in the illustrated example may cause the width of the media and phone application interfaces to each be increased by the same amount, while subsequently decreasing the width of the navigation application by the amount that the media and phone application interfaces were increased. Dragging the resize control 502 upward in the illustrated example may cause the height of the phone application interface to increase, the height of the media application interface to decrease by the same amount as the phone application interface increased, and may not affect the navigation application interface. Dragging the resize control 502 diagonally may cause the simultaneous changes in size of application interfaces associated with both downward/upward and left/right movements depending on the direction of the diagonal movement.

As discussed above, the effects of moving the resize control 502 may be bound by the minimum and/or maximum overall sizes, lengths, and/or widths. For example, a user may only be able to move the resize control 502 to a boundary of a cell of a grid (e.g., grid 400 of FIG. 4) that corresponds to the maximum size of an application interface and/or a minimum size of an application interface. For example, the resize control 502 in layout A of FIG. 5 may be able to be moved upward or to the left, but may not be moveable downward or further to the right, as such movement may exceed the maximum size of the navigation application interface, the minimum width of the media application interface, and/or the minimum height and width of the phone application interface. In this way, the resize control 502 may "stick" to the grid cell boundaries that represent minimum/maximum sizes of application interfaces.

Additionally, the amount that each application interface is resized may be based on a size of the cells of the grid to which the user interface is tied. For example, a movement of the resize control 502 that does not traverse at least half of the height or width of a grid cell may not result in any resizing operation being performed. Movements that do traverse at least half of the height or width of a grid cell will result in resizing the application interfaces to occupy that grid cell (or each grid cell that the resize control traverses at least halfway through). In this way, the application interfaces may be snapped to a nearest grid cell, even if a movement of the resize control does not reach a farthest edge of that cell from a boundary of the application interface at the start of the resize input. As an example, if the resize control 502 of layout A in FIG. 5 were to be moved to the left (e.g., toward the navigation application interface rather than toward the media and phone application interfaces), the width of the media and phone application interfaces would be increased to occupy each additional column of cells that the resize control traverses at least halfway through (e.g., halfway through the width of the cells of that column). The widths or heights of application interfaces are thus only snapped to boundaries/edges of cells of a grid (e.g., grid 400 of FIG. 4), based on the movement of the resize control 502.

As the size and/or aspect ratio of an application interface changes, the amount of space for presenting information thereby changes. In order to make the most of the available space, the application interfaces may be automatically controlled to change the format and/or content of information displayed based on the size of the application interface (e.g., the number of cells the application interface occupies). The change in the presentation of content may be made responsive to the application interface size transitioning from one side of a threshold to another side of the threshold (e.g., resizing from a number of cells that is larger than the threshold to a number of cells that is smaller than the threshold or vice versa), and there may be multiple thresholds associated with different degrees of content changes. FIGS. 6A-6D show example layouts of application interfaces and associated differences in displayed content.

Figure 6A:
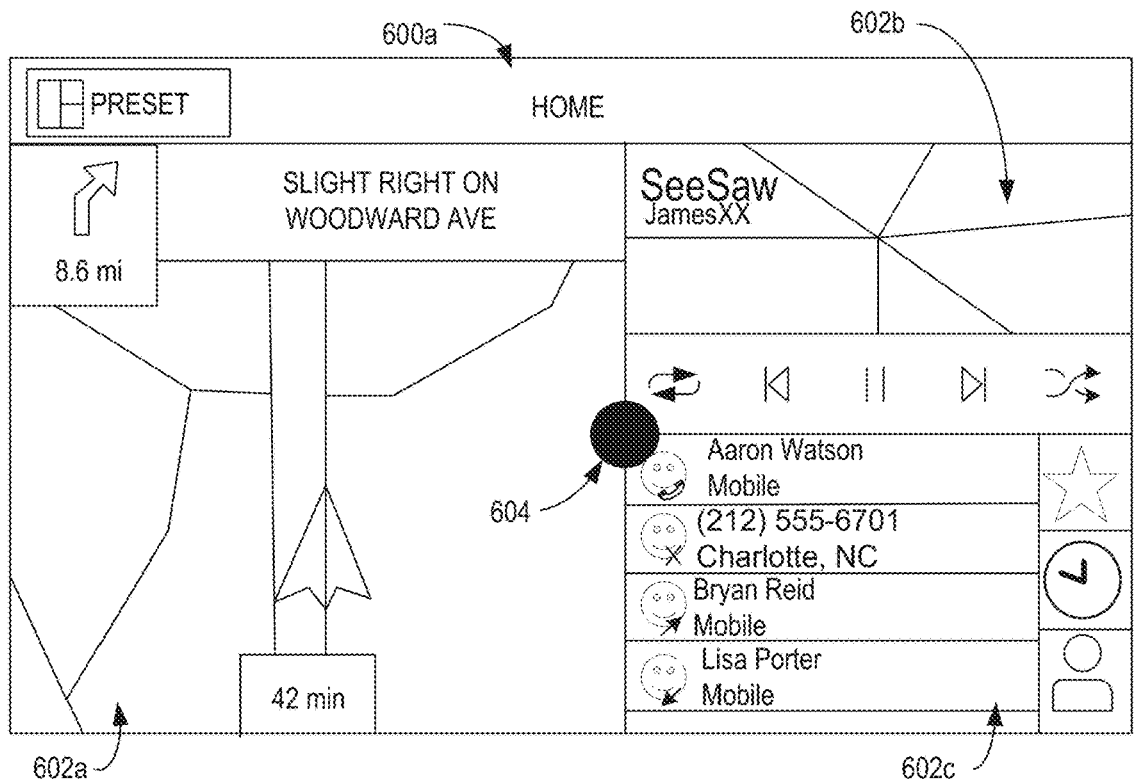
FIGS. 6A-6D show example changes in content of application interfaces responsive to resizing the application interfaces in accordance with one or more embodiments of the present disclosure.

FIG. 6A shows an example user interface layout 600a in which a navigational application interface 602a occupies approximately half of the user interface (e.g., 4×4 cells of a grid for the user interface), and a media application interface 602b and phone application interface 602c split the remaining portions of the user interface (e.g., 4×2 cells each). With such a size, the navigation application interface 602a may present a map view of a navigation route including a current position of the vehicle, an indication of a time left to a destination, an indication of a next navigation instruction (e.g., a next turn), and an indication of a distance to the next instruction. The media application interface 602b may display a name, artist, and/or other identifying information of a currently-played track, a currently-queued/paused track, a current radio station, etc., an extended or full view of album art/station image/visualization/other graphic element related to the track/album/station, and one or more user interface elements for controlling playback of the media (e.g., a previous track/station, next track/station, pause, shuffle, repeat, play, stop, eject, volume control, equalizer, etc.). The phone application interface 602c may display a list of contacts/telephone numbers with names, phone types, locations, contact avatars, and/or other information, as well as a user interface panel for selecting to view a list of contacts, a list of recent calls (where a status of the calls, e.g., received, sent, rejected/not completed, etc., are indicated), and a list of favorite contacts.

Figure 6B:
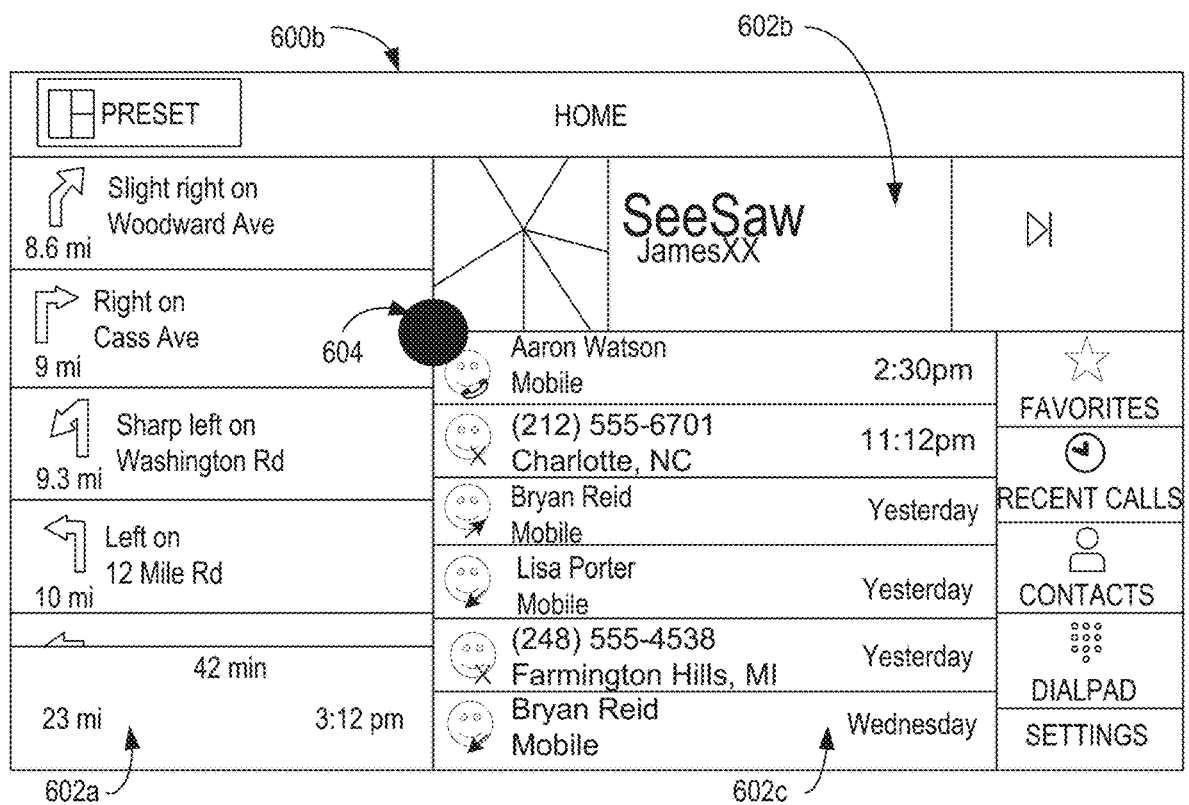

In FIG. 6B, the user interface layout 600b is changed from layout 600a of FIG. 6A in that the size of the navigation and media application interfaces are reduced, while the size of the phone application interface is increased (due to the movement of resize control 604). As a result, the navigation application interface 602a is adjusted to display a list view of upcoming route instructions (e.g., turns) instead of the map view. The navigation application interface may also indicate a time and distance to a destination and an estimated time of arrival at the destination. The media application interface 602b is adjusted to display a thumbnail of an album/station/etc. graphic (e.g., a smaller sized-version of the graphic than displayed in FIG. 6A), an identifier of a track, artist, album, station, etc., and a truncated playback control menu (e.g., a single control, such as a next track/album/station, or fewer controls than displayed when the media application interface occupies more cells). The expanded version of the phone application interface 602c is adjusted to display additional information, such as a time at which calls were received/made in a recent calls list, text to accompany icons for the user interface panel, and additional selectable options in the user interface panel (e.g., a dial pad and a settings option).

Figure 6C:
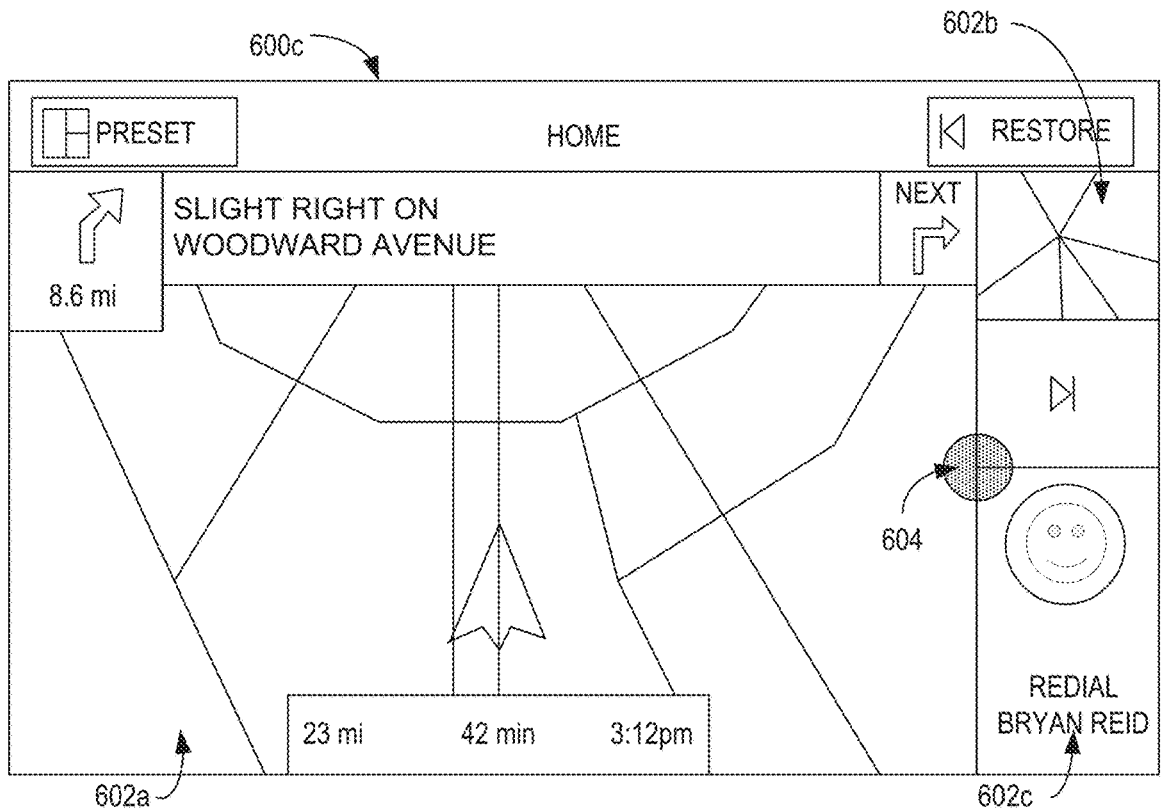

In FIG. 6C, a user interface 600c may include the navigation application interface 602a that is expanded to occupy a maximum size (e.g., all cells of the user interface other than the last column and the top portion of the user interface with the status bar). As a result, the navigation application interface presents a wider view of a map (e.g., with more of a surrounding region of the vehicle than displayed in FIG. 6A) and an indication of a direction for a next turn/instruction. The 1×2 cell versions of the media application interface 602b and the phone application interface 602c show significantly less content than the larger versions of FIGS. 6A and 6B. For example, the media application interface shows only a thumbnail graphic representing content being played/queued to play/paused and a single user interface control (e.g., a next track/album/station control). The phone application interface shows only an avatar and name for a last-contacted (or favorite) contact individual and a user interface element to redial that contact individual.

Figure 6D:
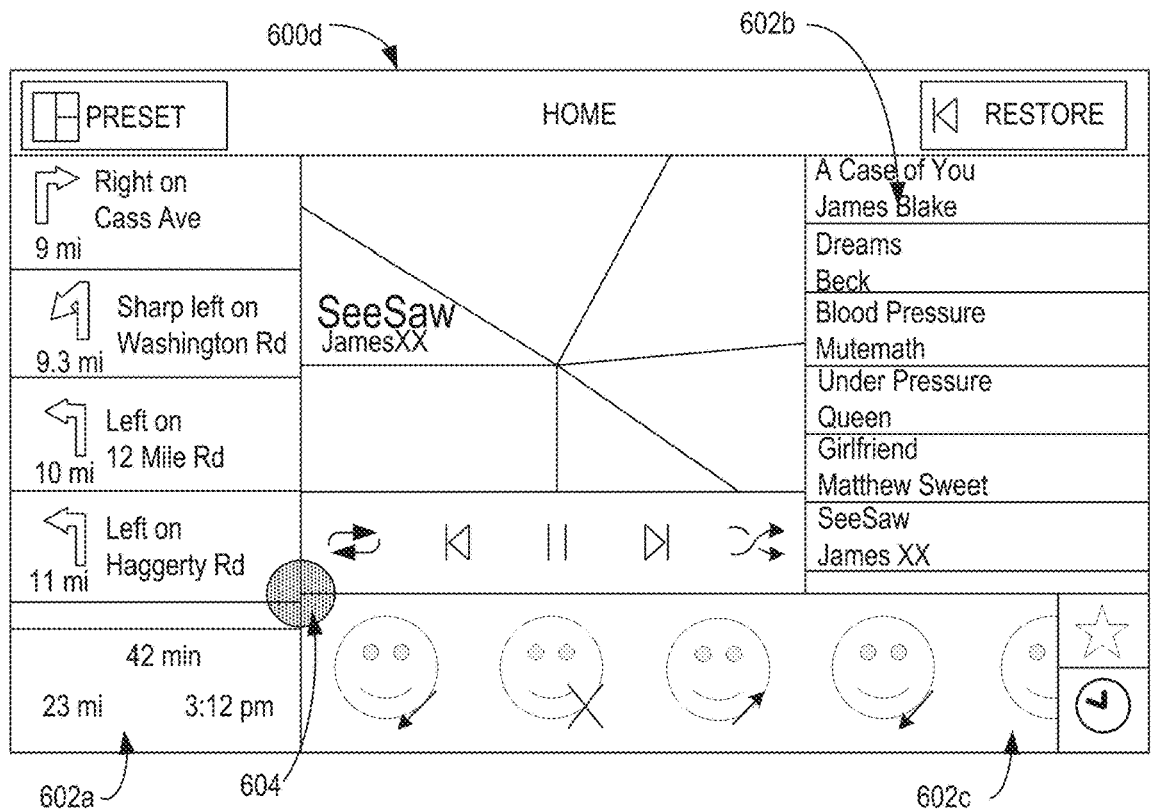

FIG. 6D shows a user interface 600d including an expanded media application interface presentation, in which the navigation application interface 602a is reduced to its minimum size (e.g., 2×4), the phone application interface 602c is presented in a small size (e.g., 5×1), and the media application interface 602b is presented in its maximum size (e.g., 5×3). The minimum navigation application interface is described above (e.g., the list view of navigation instructions). The small size phone application interface shows selectable avatars for a recent call list (including an indication of whether the recent calls were received, sent, or rejected/not completed) and a truncated user interface panel including only icons (no text) for fewer options than the larger version shown in FIGS. 6A and 6B (e.g., 2 options— favorites and recent, as illustrated). The maximum-sized media application interface includes a full view of the graphic and text identifying the artist/album/station of a currently playing/queued for playback media item, a full user interface panel of control elements for controlling playback of the media, and a list of upcoming or recently played tracks/artists.

In the above examples, the display of content may change as the user resizes the application interfaces in order to allow the user to preview an appearance of the application interfaces before releasing the resize control to set a particular layout. Each version of the application interface may be based on a respective threshold or range of width, height, or overall size of the application interface. For example, some application interfaces may change the style/type/amount of content displayed responsive to any change in size (e.g., any change in a quantity of cells that that application interface occupies), whereas others may allow the same style/type/amount of content to be displayed when the application interface occupies two or more different quantities of cells). In some examples, the style/type of content displayed (e.g., a number of user interface elements, icons versus text, map versus list, etc.) may be maintained while the application interface is resized to occupy different quantities of cells, but the displayed content may be stretched or zoomed in/out based on the quantity of cells that that application interface occupies.

Figure 7:
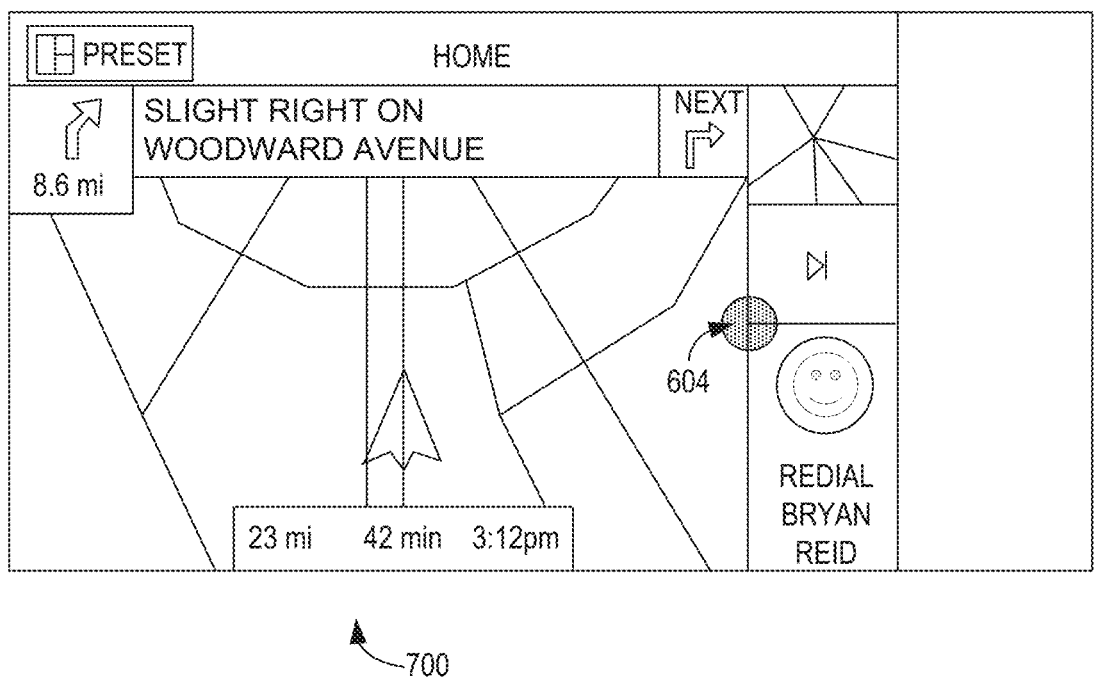
FIG. 7 shows an example user interface displayed responsive to changing an overall size of the user interface in accordance with one or more embodiments of the present disclosure.

In examples where the overall user interface that includes the multiple application interfaces may be resized (e.g., where the user interface is presented in a resizable window or a display size is configurable) changes to the user interface as a whole may be distributed to each application interface. For example, FIG. 7 shows an example user interface 700 having a different aspect ratio than that of FIGS. 6A-6D. Such an aspect ratio may be achieved by reducing a width of the overall user interface. Responsive to such a resizing operation, the effective grid size (e.g., as shown in FIG. 4) may be reduced to accommodate the new aspect ratio. Upon resizing the overall user interface 700, each application interface displayed within the user interface may be adjusted to accommodate a similar percentage of the available space within the newly sized user interface. In other examples, application interfaces on a side of the user interface that is being moved to cause the resizing may be reduced to their respective minimum widths/heights (depending on the type of resizing) before changing the size of the other application interface(s).

Figure 8:
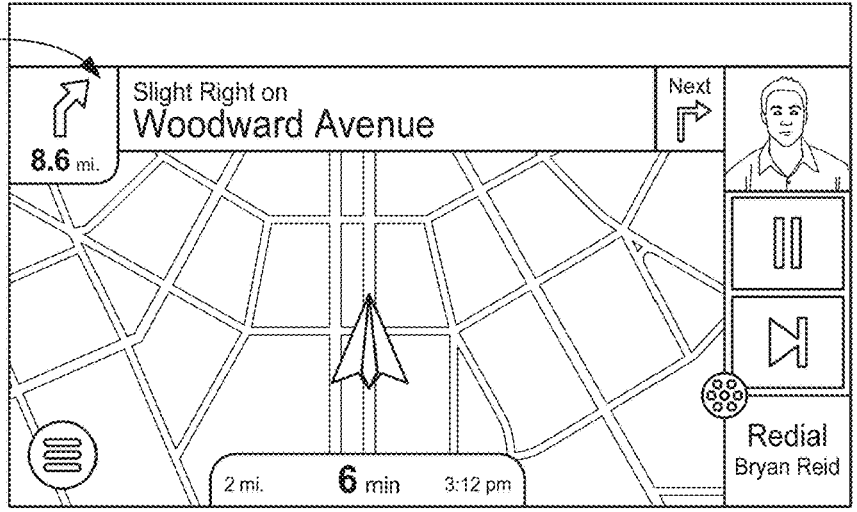
FIG. 8 shows an example timeline of appearances of application interfaces in a user interface in accordance with one or more embodiments of the present disclosure.
Figure 8:
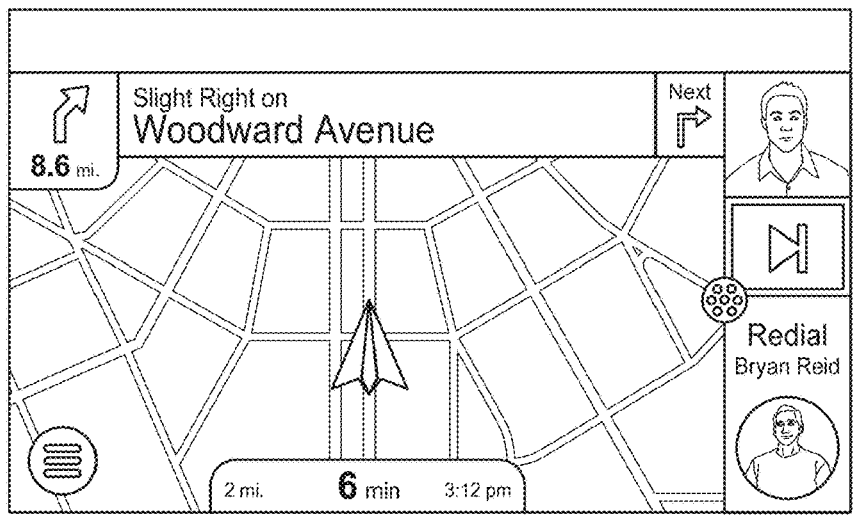
Figure 8:
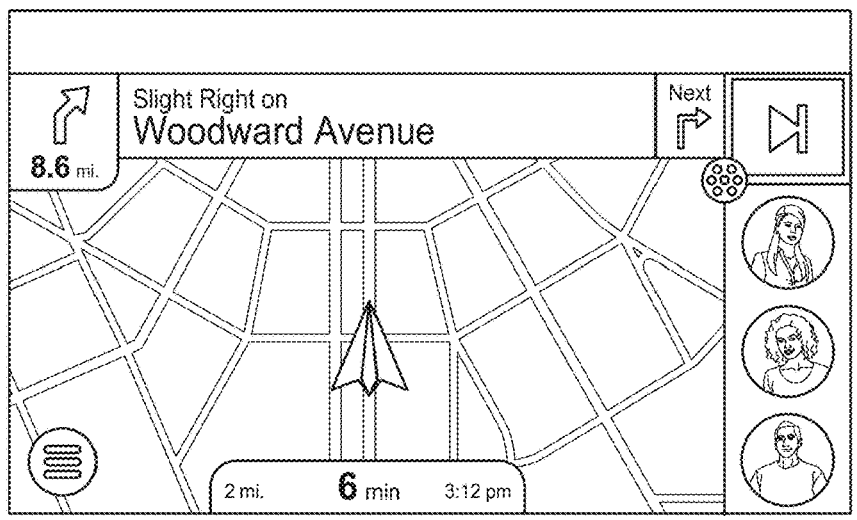
Figure 8:
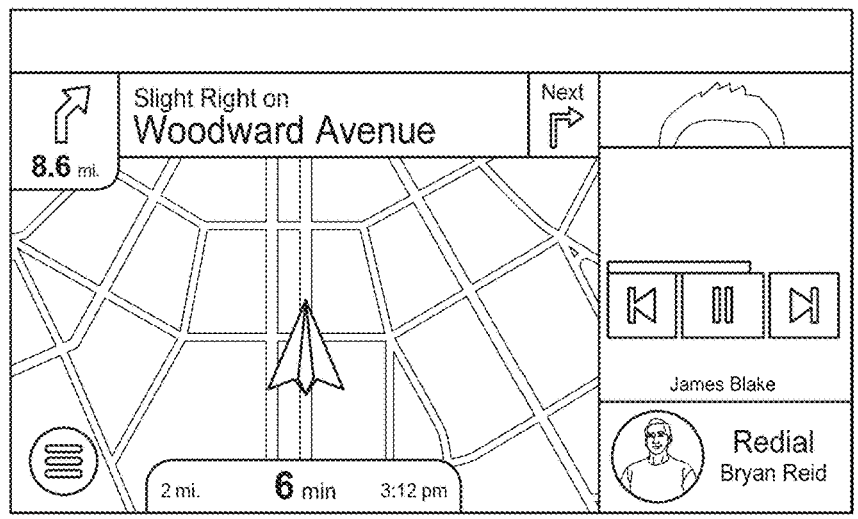
Figure 8:
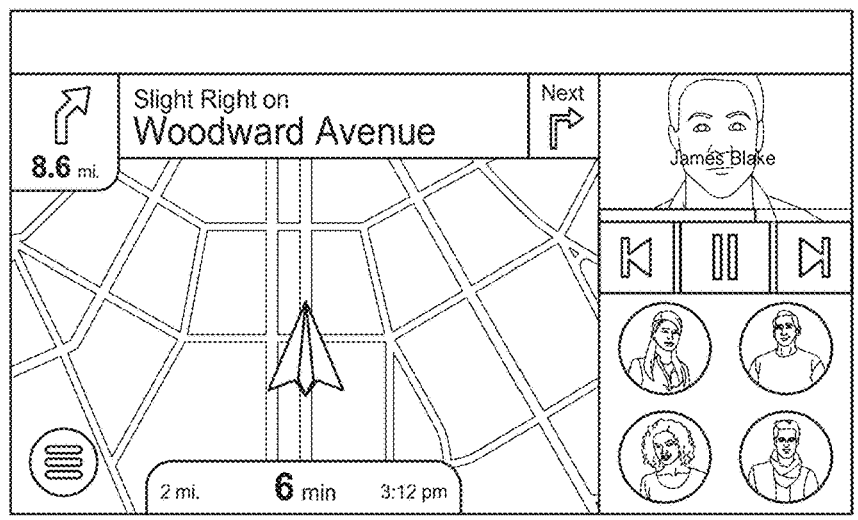
Figure 8:
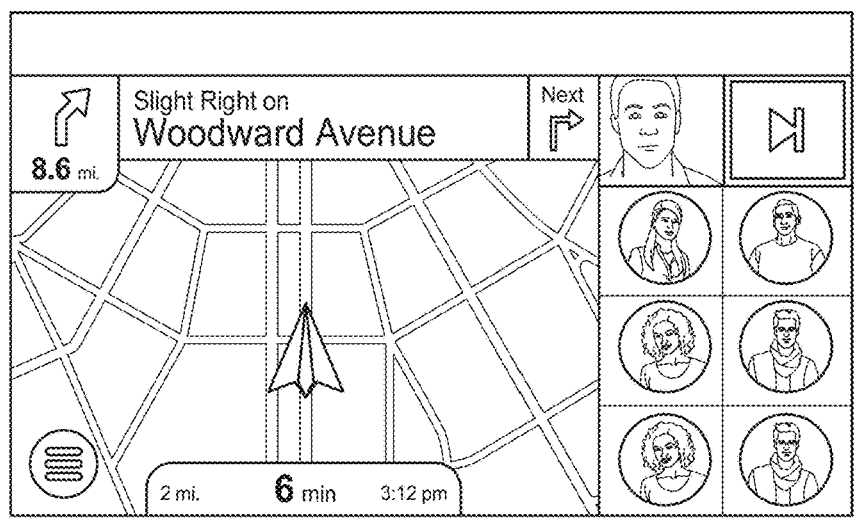
Figure 8:
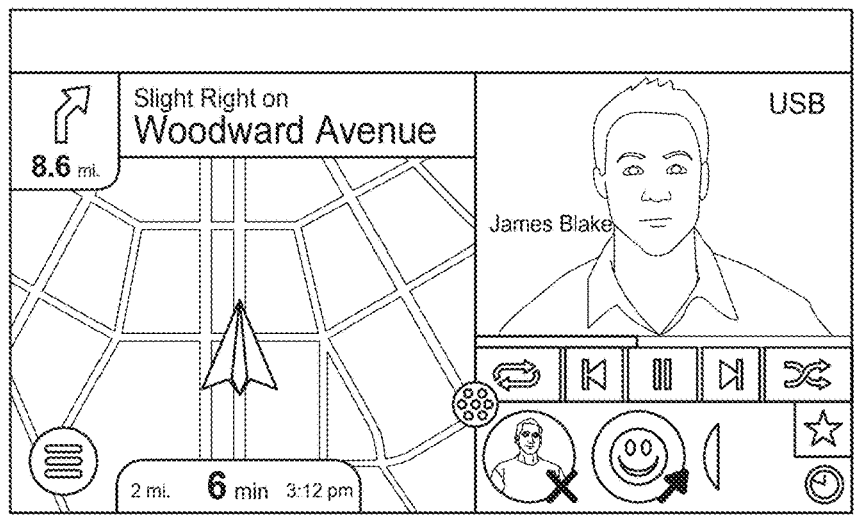
Figure 8:
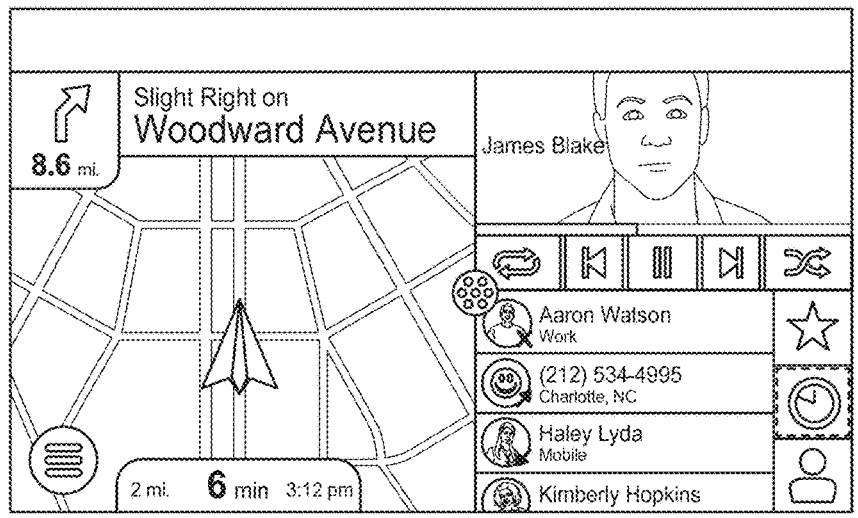
Figure 8:
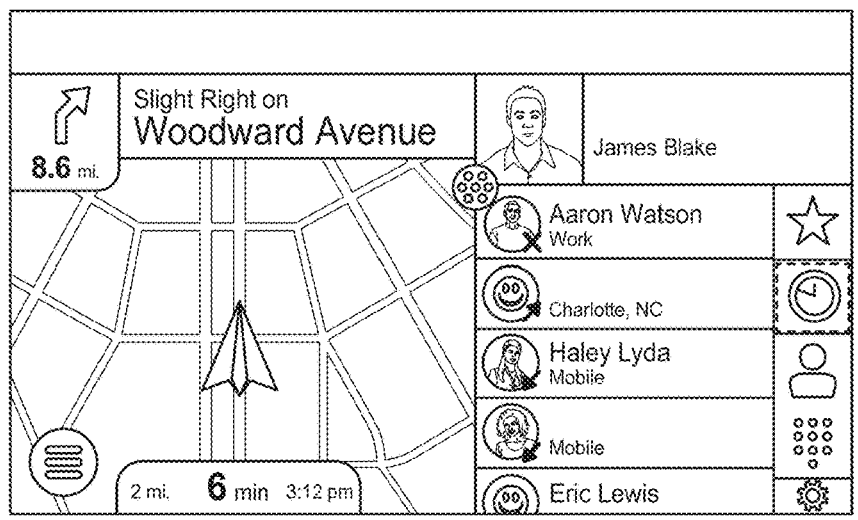
Figure 8:
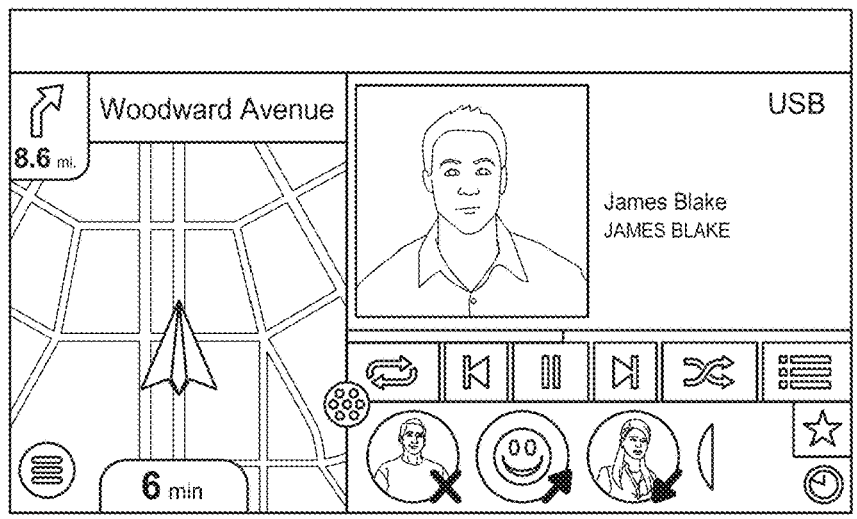
Figure 8:
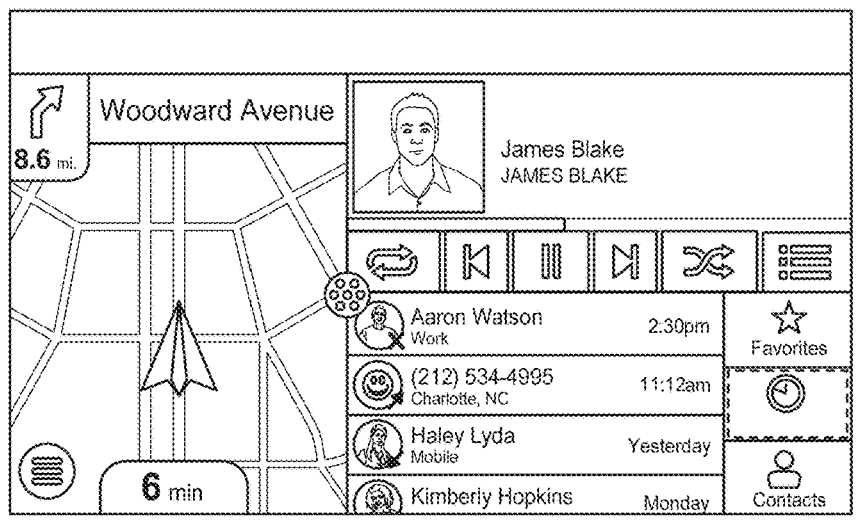
Figure 8:
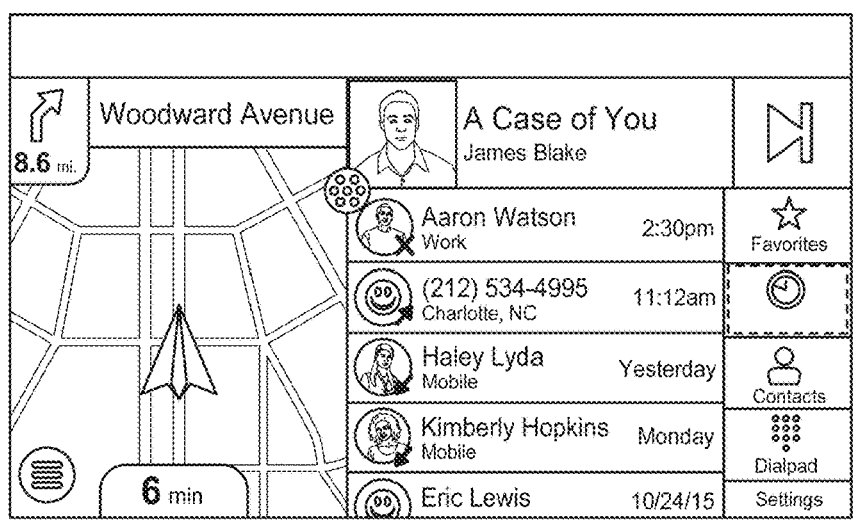
Figure 8:
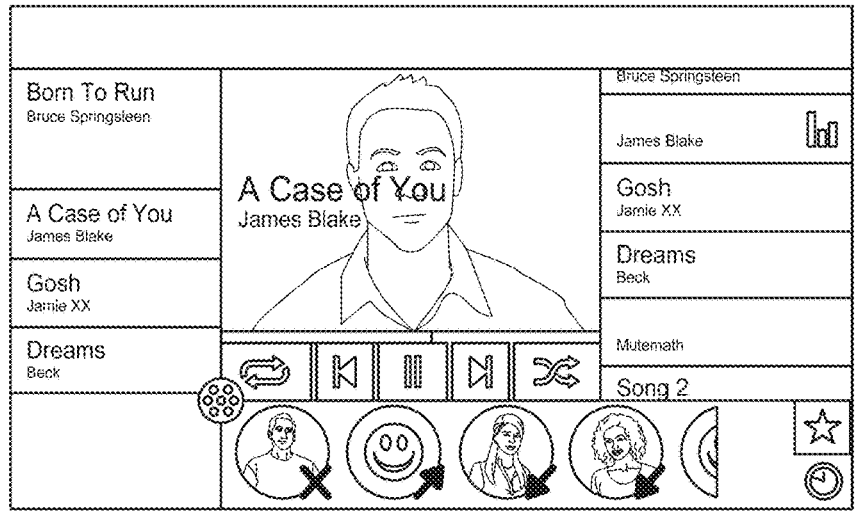
Figure 8:
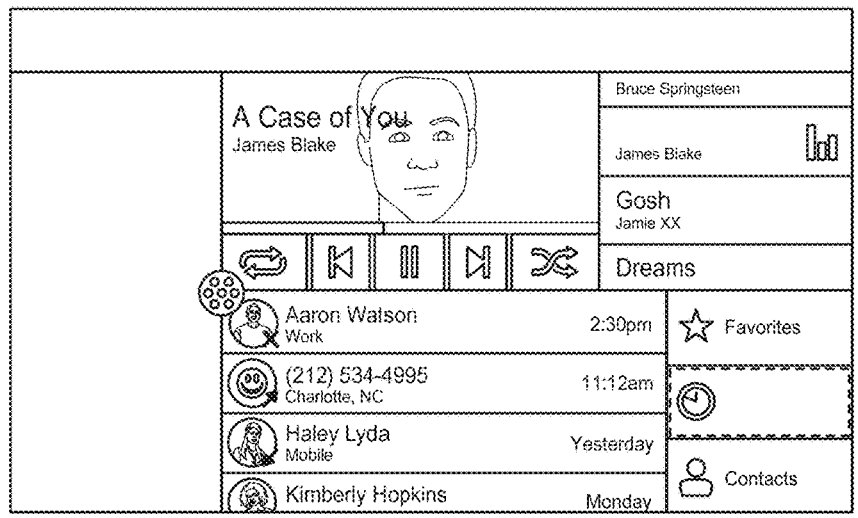
Figure 8:
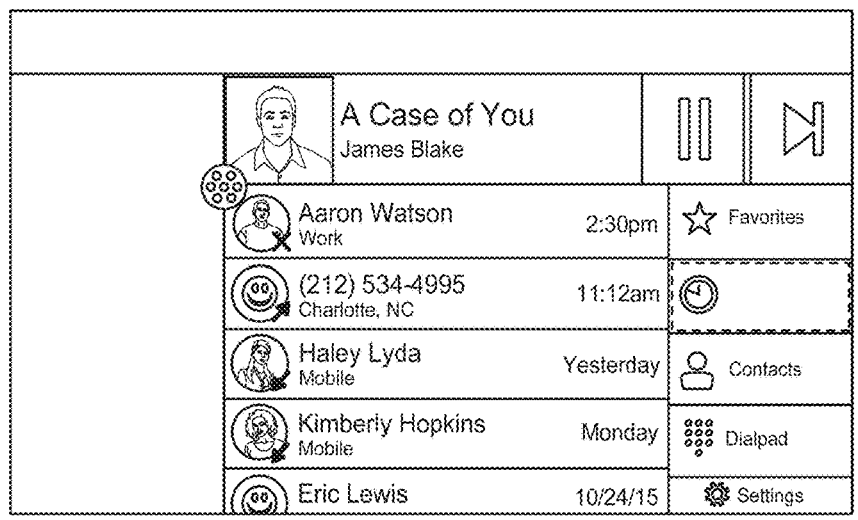

FIG. 8 shows a timeline 800 of example appearances/states of a user interface 802 as a user interacts with the user interface to resizing application interfaces displayed within the user interface. The illustrated grid in some of the user interface appearances is presented for illustrative purposes and may not be displayed to a user during presentation of that user interface.

Figure 9:
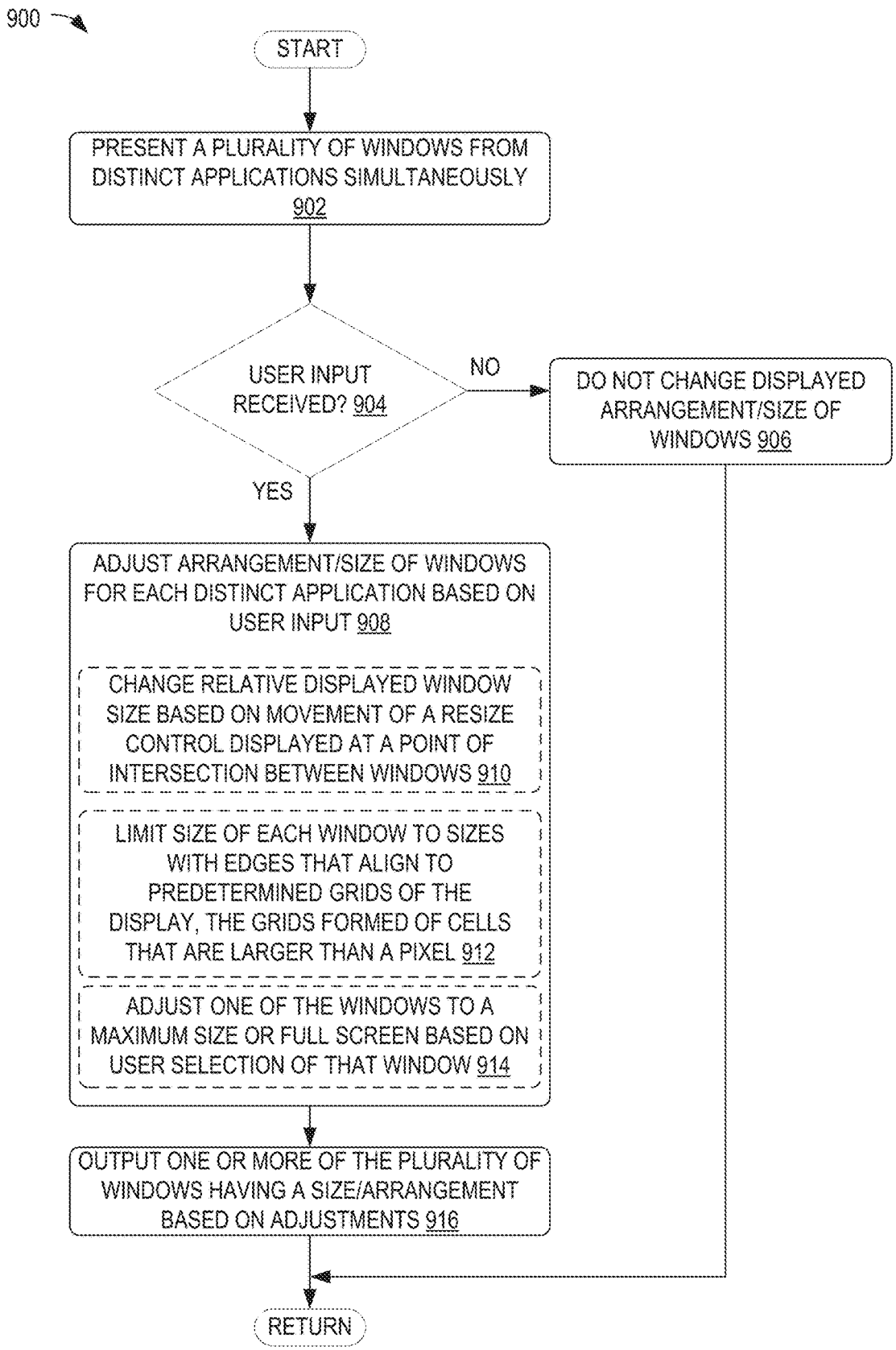
FIG. 9 shows a flow chart of an example method for selectively adjusting displayed windows of a user interface.

FIG. 9 shows a flow chart of an example method 900 for selectively adjusting displayed windows of a user interface. For example, method 900 may be performed by an in-vehicle computing system (e.g., in-vehicle computing system 109 of FIG. 1 or 200 of FIG. 2) to present a user interface (e.g., in views such as those described above with respect to FIGS. 3A-8. At 902, the method includes presenting a plurality of windows from distinct applications simultaneously. For example, three applications may be displayed as described above with respect to FIGS. 6A-6D.

At 904, the method includes determining if user input has been received. If user input has not been received (or a qualifying user input determined to relate to a request to change a display [e.g., size/arrangement] of the windows of the user interface has not been detected, or otherwise "NO" at 904), the method proceeds to 906 to not change the displayed arrangement/size of the windows (e.g., to maintain the displayed arrangement/size of the windows until a qualifying user input is received). If user input has been received (or qualifying user input determined to relate to a request to change a display [e.g., size/arrangement] of the windows of the user interface has been detected, or otherwise "YES" at 904), the method proceeds to 908.

At 908, the method includes adjusting the arrangement and/or size of the windows for each distinct application based on the user input. For example, the method may include changing a relative displayed window size based on the movement of a resize control displayed at a point of intersection between the windows, as indicated at 910. FIGS. 6A-6D show examples of such transitions. As indicated at 912, the method may include limiting the size of each window to sizes having edges that align to predetermined grids of the display (e.g., grid 400 of FIG. 4), the grids formed of cells that are larger than a pixel. As indicated at 914, the method may include adjusting one of the windows to a maximum size or to a full screen view based on user selection of that window (described in more detail above). For example, in a full screen view, the selected window may be displayed, while one or more of the remaining windows may not be displayed. At 916, the method includes outputting one or more of the plurality of windows having a size and/or arrangement based on the adjustments.

The examples described herein relating to a presentation of multiple application interfaces in a single user interface simultaneously may occur during operation of a computing device (e.g., in-vehicle computing system 109 of FIG. 1 or 200 of FIG. 2) in a multi-view mode. During operation in the multi-view mode, the application interfaces may be bound to a grid (e.g., to only be displayed at sizes/locations that completely fill at least one grid cell), such as grid 400 of FIG. 4. The application interfaces and/or other displayable content may only become unbound to such a grid upon exiting the multi-view mode. In some examples, exiting the multi-view mode may enable a user to resize the simultaneously-displayed application interfaces freely without snapping the interfaces to the grid or otherwise binding the size/positions of the interfaces to the grid. In additional or alternative examples, exiting the multi-view mode may switch to a single-application interface view in which only one application interface (or fewer application interfaces than were shown in the multi-view mode) is presented (e.g., in full screen, with only that application interface being displayed without any other application interface being simultaneously displayed, or only that application interface and a status bar or other operating system menu being displayed without any other application interface being simultaneously displayed).

The methods and systems described herein provide for an in-vehicle computing system including a display device, a user input interface, a processor, and a storage device storing instructions executable by the processor to present, via the display device, a multi-view user interface including a plurality of application interfaces each displaying content for a different application simultaneously with one another, each application interface filling at least one cell of a grid according to which the display of the user interface is controlled, detect, via the user input interface, user input requesting a resize operation associated with the plurality of application interfaces (e.g., a request for the application interfaces to be resized), the user input indicating an updated location of at least one boundary of at least two of the application interfaces, selectively adjust the size of each application interface by snapping the at least one boundary of the at least two application interfaces to a nearest cell boundary of a cell of the grid. In a first example of the in-vehicle computing system, the instructions may additionally or alternatively be further executable to change the content displayed in each resized application interface based on a size of that resized application interface. A second example of the in-vehicle computing system optionally includes the first example, and further includes the system, wherein changing the content comprises changing a number of user interface elements displayed in the application interface. A third example of the in-vehicle computing system optionally includes one or both of the first example and the second example, and further includes the system, wherein changing the content comprises changing from a list view to a map view in a navigation application interface. A fourth example of the in-vehicle computing system optionally includes one or more of the first through the third examples, and further includes the system, wherein the plurality of application interfaces includes a navigation application interface, a media application interface, and a phone application interface. A fifth example of the in-vehicle computing system optionally includes one or more of the first through the fourth examples, and further includes the system, wherein detecting the user input includes detecting touch input to a user interface element displayed at an intersection of boundaries of each of the application interfaces displayed in the user interface. A sixth example of the in-vehicle computing system optionally includes one or more of the first through the fifth examples, and further includes the system, wherein the instructions are further executable to, for each resized application interface, change a size of content displayed in that resized application interface based on a size of that resized application interface. A seventh example of the in-vehicle computing system optionally includes one or more of the first through the sixth examples, and further includes the system, wherein the instructions are further executable to, in response to user selection of a selected application interface of the plurality of application interfaces, display the selected application interface in a full screen view and not display remaining application interfaces of the plurality of application interfaces. An eighth example of the in-vehicle computing system optionally includes one or more of the first through the seventh examples, and further includes the system, wherein the instructions are further executable to snap a selected application interface to a predetermined size responsive to user input directed to the selected application interface, the predetermined size being based on a type of input directed to the selected application interface.

The methods and systems described herein provide for a method of operating an in-vehicle computing system having a user input interface displayed on a display device, comprising presenting, via the display device, simultaneously, a plurality of windows from distinct applications, and in response to receiving user input, concurrently changing relative displayed window sizes for the plurality of windows, where sizes of each of the plurality windows are limited only to window sizes with edges that align to predetermined grids of the display, the grids formed of cells that are larger than a pixel. In a first example of the method, the distinct applications may additionally or alternatively include two or more of a media application, a navigation application, and a phone application. A second example of the method optionally includes the first example, and further includes the method, wherein the user input includes a selection of a resize control displayed at a point of intersection between each of the windows. A third example of the method optionally includes one or both of the first and the second examples, and further includes the method, further including, in response to user selection of a selected window of the plurality of windows, displaying the selected window at a maximum size. A fourth example of the method optionally includes one or more of the first through the third examples, and further includes the method, further including, in response to user selection of a selected window of the plurality of windows, displaying the selected window in a full screen view and not displaying remaining windows of the plurality of windows. A fifth example of the method optionally includes one or more of the first through the fourth examples, and further includes the method, further including changing content displayed in each resized window based on a size of that resized window. A sixth example of the method optionally includes one or more of the first through the fifth examples, and further includes the method, wherein changing the content comprises changing a number of user interface elements displayed in the application interface. A seventh example of the method optionally includes one or more of the first through the sixth examples, and further includes the method, wherein changing the content comprises changing from a list view to a map view in a navigation application interface. An eighth example of the method optionally includes one or more of the first through the seventh examples, and further includes the method, further including changing a size of content displayed in each resized window based on a size of that resized window. A ninth example of the method optionally includes one or more of the first through the eighth examples, and further includes the method, further comprising snapping a selected application interface to a predetermined size responsive to user input directed to the selected application interface, the predetermined size being based on a type of input directed to the selected application interface. A tenth example of the method optionally includes one or more of the first through the ninth examples, and further includes the method, wherein the type of input is based on one or more of a duration of input and a number of inputs directed to the selected application interface.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or 200 described with reference to FIGS. 1 and 2. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system comprising:
a display device;
a user input interface;
a processor; and
a storage device storing instructions executable by the processor to:
present, via the display device, a multi-view user interface including a plurality of application interfaces, each of the plurality of application interfaces displaying content for a different application simultaneously with one another, and each application interface filling at least one cell of a grid according to which presentation of the multi-view user interface is controlled;
detect, via the user input interface, user input requesting a resize operation associated with the plurality of application interfaces, the user input indicating an updated location of at least one boundary of at least two of the plurality of application interfaces; and
selectively adjust a size of each application interface of the plurality of application interfaces by snapping the at least one boundary of the at least two application interfaces to a nearest cell boundary of an associated cell of the grid,
wherein the grid is formed of cells that are larger than a pixel;
wherein each cell of the grid has the same size;
wherein a portion of the multi-view user interface includes a preset button for reverting the plurality of application interfaces to one or more other layouts; and
wherein a selection of the preset button causes a preset menu to be displayed.

2. The in-vehicle computing system of claim 1, wherein the instructions are further executable to change the content displayed in each resized application interface based on a size of that resized application interface.

3. The in-vehicle computing system of claim 2, wherein changing the content comprises changing a number of user interface elements displayed in each resized application interface.

4. The in-vehicle computing system of claim 2, wherein changing the content comprises changing from a list view to a map view in a navigation application interface.

5. The in-vehicle computing system of claim 1, wherein the instructions are further executable to, for each resized application interface, change a size of content displayed in that resized application interface based on a size of that resized application interface.

6. The in-vehicle computing system of claim 1, wherein the plurality of application interfaces includes a navigation application interface, a media application interface, and a phone application interface.

7. The in-vehicle computing system of claim 1, wherein detecting the user input includes detecting touch input to a user interface element displayed at an intersection of boundaries of each of the plurality of application interfaces displayed in the multi-view user interface.

8. The in-vehicle computing system of claim 1, wherein the instructions are further executable to snap a selected application interface of the plurality of application interfaces to a predetermined size responsive to user input directed to the selected application interface, the predetermined size being based on a type of input directed to the selected application interface.

9. The in-vehicle computing system of claim 1, wherein the user input includes a selection of a resize control displayed at a point of intersection between the application interfaces; and wherein the sizes of each application interface for the plurality of application interfaces are concurrently adjusted upon the resize control traversing at least an amount based upon a size of the cells of the grid.

10. The method of claim 1, wherein the preset menu includes at least one of: a default preset layout; and one or more previously-stored layouts.

11. The method of claim 1, wherein the other layouts indicate at least one of: an arrangement of application interfaces; and a sizing of application interfaces.

12. The method of claim 1, wherein a first selection mechanism of the preset button reverts the plurality of application interfaces to a first layout, and a different, second selection mechanism reverts the plurality of application interfaces to a second layout.

13. A method of operating an in-vehicle computing system having a user input interface displayed on a display device, comprising:
presenting, via the display device, simultaneously, a plurality of windows from distinct applications; and
in response to receiving a user input, concurrently changing relative displayed window sizes for the plurality of windows, where sizes of each of the plurality of windows are limited only to window sizes with edges that align to a predetermined grid of the display device, the grid being formed of cells that are larger than a pixel;
wherein each of the plurality of windows has a width in cells of the grid and a height in cells of the grid;
wherein the user input includes a selection of a resize control displayed at a point of intersection between each of the windows; and
wherein the relative displayed window sizes for the plurality of windows are concurrently changed upon the resize control traversing at least an amount based on a size of the cells of the grid.

14. The method of claim 13, wherein the distinct applications include two or more of a media application, a navigation application, and a phone application.

15. The method of claim 13, further comprising changing content displayed in each resized window based on a size of that resized window.

16. The method of claim 15, wherein changing the content comprises changing a number of user interface elements displayed in each resized window.

17. The method of claim 15, wherein changing the content comprises changing from a list view to a map view in a navigation window.

18. The method of claim 13, further comprising changing a size of content displayed in each resized window based on a size of that resized window.

19. The method of claim 13, further comprising snapping a selected application interface to a predetermined size responsive to a user input directed to the selected application interface, the predetermined size being based on a type of input directed to the selected application interface.

20. The method of claim 13, wherein relative displayed window sizes for the plurality of windows are concurrently changed upon the resize control traversing at least one of half of a height of a cell of the grid or half of a width of a cell of the grid.

* * * * *